United States Patent
Johnson et al.

(10) Patent No.: US 10,207,791 B2
(45) Date of Patent: Feb. 19, 2019

(54) ACTUATOR ASSEMBLIES TO DEPLOY AIRCRAFT LEADING EDGE FLAPS AND SEALS FOR AIRCRAFT LEADING EDGE FLAPS

(71) Applicant: The Boeing Company, Chicago, IL (US)

(72) Inventors: Patterson Johnson, Mukilteo, WA (US); Seiya Sakurai, Everett, WA (US); Gregory M. Santini, Bothell, WA (US); Christopher A. Konings, Lynnwood, WA (US); Adam M. Clark, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/631,966

(22) Filed: Jun. 23, 2017

(65) Prior Publication Data

US 2018/0370615 A1 Dec. 27, 2018

(51) Int. Cl.
*B64C 9/02* (2006.01)
*B64C 9/24* (2006.01)

(52) U.S. Cl.
CPC . *B64C 9/02* (2013.01); *B64C 9/24* (2013.01)

(58) Field of Classification Search
CPC .... B64C 9/00; B64C 9/02; B64C 9/16; B64C 9/18; B64C 9/20; B64C 9/22; B64C 9/24; B64C 9/26
See application file for complete search history.

(56) References Cited

U.S. PATENT DOCUMENTS

| | | | |
|---|---|---|---|
| 1,472,199 A | | 10/1923 | Thomson |
| 2,614,774 A | | 10/1952 | Donovan |
| 2,620,147 A | * | 12/1952 | Cook, Jr. .............. B64C 9/16 244/216 |
| 4,131,252 A | * | 12/1978 | Dean .................... B64C 9/16 244/130 |
| 4,159,089 A | * | 6/1979 | Cole .................... B64C 9/24 244/214 |
| 4,171,787 A | | 10/1979 | Zapel |

(Continued)

FOREIGN PATENT DOCUMENTS

| | | |
|---|---|---|
| DE | 665964 | 10/1938 |
| DE | 1908375 | 9/1970 |

OTHER PUBLICATIONS

European Patent Office, "Partial European Search Report," issued in connection with European Patent Application No. 18178794.6, dated Aug. 27, 2018, 15 pages.

(Continued)

*Primary Examiner* — Joseph W Sanderson
(74) *Attorney, Agent, or Firm* — Hanley, Flight & Zimmerman, LLC

(57) ABSTRACT

Example actuator assemblies to deploy aircraft leading edge flaps and seals for aircraft leading edge flaps are described herein. An example apparatus includes an aircraft flap that is movable between a stowed position and a deployed position. The flap includes a top panel. A notch is formed in the top panel and extends into a side of the top panel near a trailing edge of the flap. The example apparatus also includes a seal coupled to the flap. The seal is movable to cover the notch when the flap is in the deployed position.

9 Claims, 12 Drawing Sheets

(56) References Cited

U.S. PATENT DOCUMENTS

| | | | |
|---|---|---|---|
| 4,202,519 A | | 5/1980 | Fletcher |
| 4,717,097 A | | 1/1988 | Sepstrup |
| 5,158,252 A | * | 10/1992 | Sakurai .................... B64C 3/48 |
| | | | 244/213 |
| 7,578,484 B2 | | 8/2009 | Fox et al. |
| 9,016,637 B2 | | 4/2015 | Sakurai et al. |
| 9,061,752 B2 | * | 6/2015 | Nagel ....................... B64C 3/48 |
| 9,242,718 B2 | * | 1/2016 | Wilson ..................... B64C 7/00 |
| 9,284,034 B2 | * | 3/2016 | Otto .......................... B64C 1/10 |
| 2013/0214096 A1 | * | 8/2013 | Wilson ..................... B64C 7/00 |
| | | | 244/213 |
| 2013/0228983 A1 | * | 9/2013 | Wilson ..................... B64C 7/00 |
| | | | 277/651 |
| 2013/0233976 A1 | * | 9/2013 | Nagel ....................... B64C 3/48 |
| | | | 244/201 |
| 2014/0197272 A1 | * | 7/2014 | Otto .......................... B64C 1/10 |
| | | | 244/99.3 |

OTHER PUBLICATIONS

European Patent Office, "Extended European Search Report," issued in connection with European Patent Application No. 18178794.6, dated Nov. 20, 2018, 14 pages.

* cited by examiner

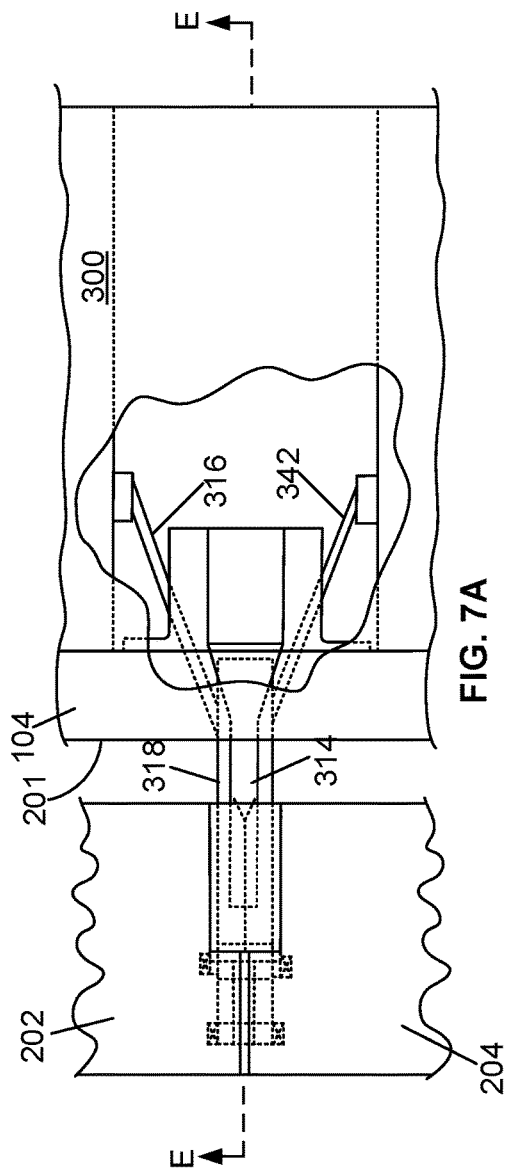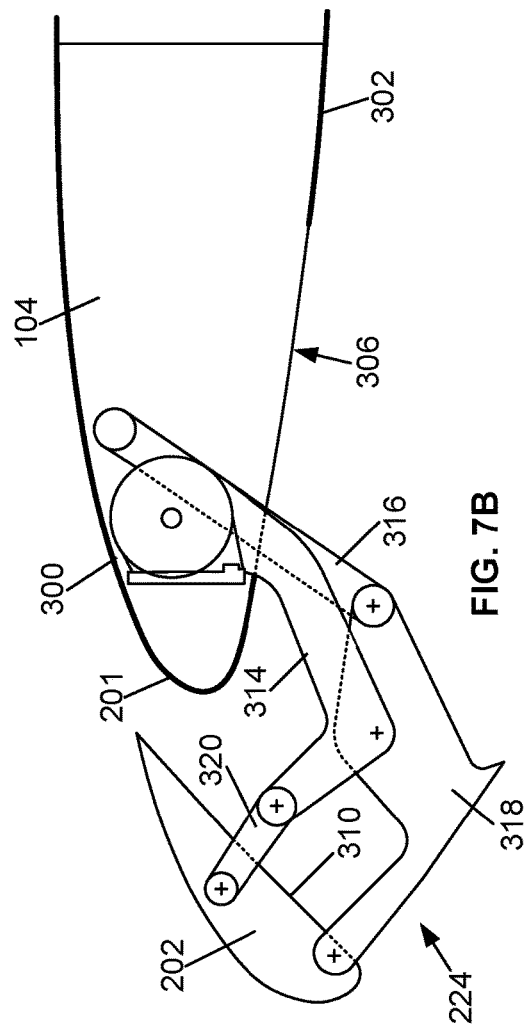
FIG. 7A
FIG. 7B

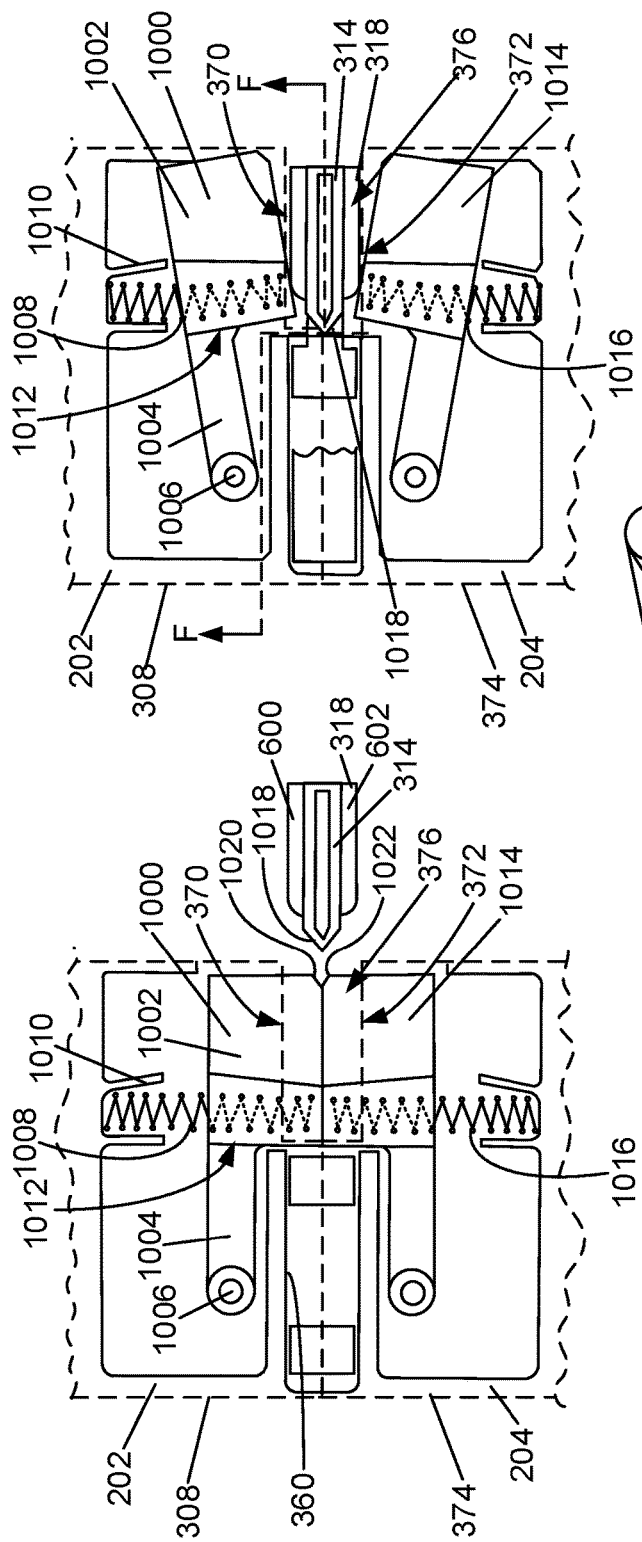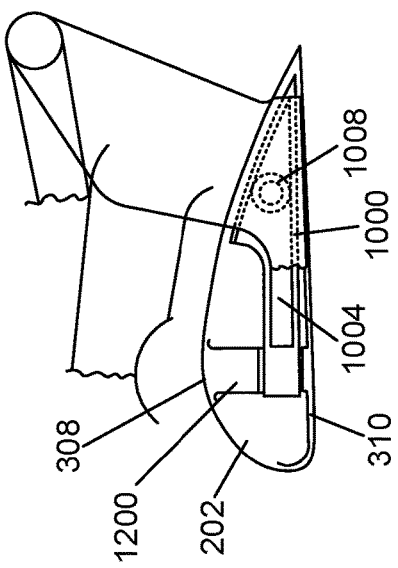

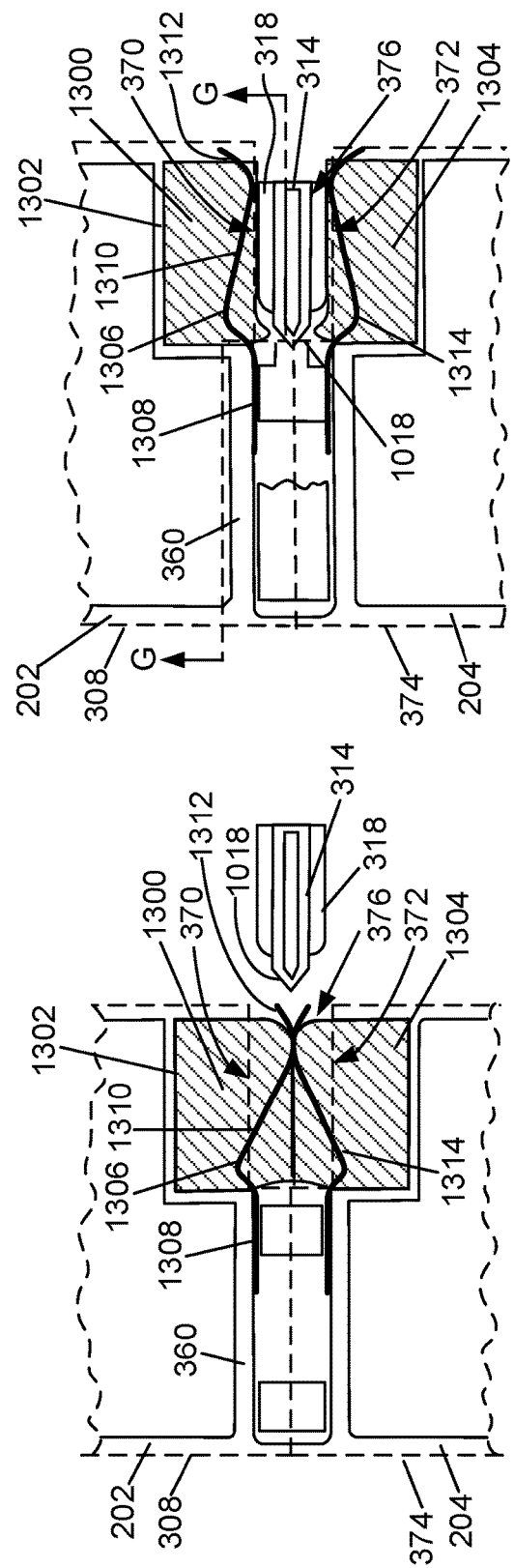
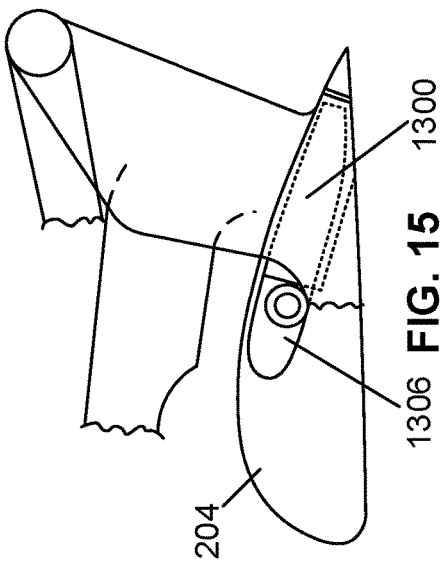

ACTUATOR ASSEMBLIES TO DEPLOY AIRCRAFT LEADING EDGE FLAPS AND SEALS FOR AIRCRAFT LEADING EDGE FLAPS

FIELD OF THE DISCLOSURE

This disclosure relates generally to aircraft and, more particularly, to actuator assemblies to deploy aircraft leading edge flaps and seals for aircraft leading edge flaps.

BACKGROUND

Fixed wing aircraft commonly employ high lift devices, sometimes referred to as auxiliary airfoils, along the leading and trailing edges of the wings. These high lift devices are actuated to extend outward from the wing to change the aerodynamic lift of the wing during takeoff and landing. A common high lift device is a Krueger flap. A Krueger flap is a leading edge flap device that is deployed outward in front of the leading edge of the wing. In general, the Krueger flap is stored within the bottom of the wing near the leading edge and is swung, along an arc, outwardly from the bottom of the wing to a position in front of the leading edge of the wing. Krueger flaps are capable of changing the airflow over the wing to generate more or less lift, which is beneficial, for instance, during takeoff and landing. Krueger flaps are advantageous because they do not change the position or shape of the leading edge of the wing as compared to other high lift devices like leading edge slats or drooped leading edges.

SUMMARY

An example aircraft disclosed herein includes a wing, a flap movably coupled to the wing, and an actuator assembly to move the flap between a stowed position and a deployed position. The actuator assembly of the example aircraft includes a geared rotary actuator disposed in the wing. The geared rotary actuator has an actuating arm. The actuator assembly also includes a swing arm having a first end and a second end. The first end of the swing arm is rotatably coupled to the wing. The actuator assembly also includes a tilt arm having a first end and a second end. The second end of the swing arm is rotatably coupled to the first end of the tilt arm, an intermediate point of the actuating arm is rotatably coupled to an intermediate point of the tilt arm, and the first end of the tilt arm rotatably coupled to the flap. Further, the actuator assembly includes a kicker arm having a first end and a second end. The first end of the kicker arm is rotatably coupled to a distal end of the actuating arm and the second end of the kicker arm is rotatably coupled to the flap. The geared rotary actuator is to rotate the actuating arm to move the flap between the stowed position and the deployed position.

An example apparatus disclosed herein includes an aircraft flap movable between a stowed position and a deployed position. The flap includes a top panel. A notch is formed in the top panel and extends into a side of the top panel near a trailing edge of the flap. The apparatus also includes a seal coupled to the flap. The seal is movable to cover the notch when the flap is in the deployed position.

An example aircraft disclosed herein includes a wing and a flap movably coupled to the wing. The flap has a top panel with a notch formed in the top panel. The example aircraft also includes an actuator assembly to move the flap between a stowed position and a deployed position. When the flap is in the stowed position, at least a portion of the actuator assembly extends through the notch in the top panel of the flap. Also, the example aircraft includes a seal coupled to the flap to cover the notch when the flap is in the deployed position.

An example method to enable laminar flow over a wing of an aircraft includes moving a leading edge flap from a stowed position using an actuator assembly by activating a geared rotary actuator of the actuator assembly. The actuator assembly of the example method includes the geared rotary actuator disposed in the wing, and the geared rotary actuator has an actuating arm. The actuator assembly includes a swing arm having a first end and a second end, where the first end of the swing arm is rotatably coupled to the wing of the aircraft. The actuator assembly also includes a tilt arm having a first end and a second end. The second end of the swing arm is rotatably coupled to the first end of the tilt arm, an intermediate point of the actuating arm is rotatably coupled to an intermediate point of the tilt arm, and the second end of the tilt arm is rotatably coupled to the leading edge flap. The actuator assembly further includes a kicker arm having a first end and a second end. The first end of the kicker arm is rotatably coupled to a distal end of the actuating arm, and the second end of the kicker arm is rotatably coupled to the leading edge flap. The example method also includes ceasing movement of the leading edge flap when the leading edge flap is in a desired position by deactivating the geared rotary actuator of the actuator assembly.

BRIEF DESCRIPTION OF THE DRAWINGS

FIG. 7A is a top view of the section of the example wing illustrated in FIG. 3A showing the first example flap and the second example flap in the deployed position.

FIG. 7B is a cross-sectional view of the example wing of FIG. 7A taken along line E-E in FIG. 7A showing the example actuator assembly and the first example flap in the deployed position.

FIG. 10 is a top view of the first example flap and the second example flap of FIG. 3A in the deployed position showing example seals that may be utilized to cover notches in the first and second flaps while in the deployed position.

FIG. 11 is a top view of the first example flap and the second example flap of FIG. 10 in the stowed position and in which at least a portion of the example actuator assembly extends through the notches in the first and second flaps.

FIG. 12 is a cross-sectional view taken along line F-F of FIG. 11.

FIG. 13 is a top view of the first example flap and the second example flap of FIG. 3A in the deployed position illustrating other example seals that may be utilized to cover notches in the first and second flaps while in the deployed position.

FIG. 14 is a top of the first example flap and the second example flap of FIG. 13 in the stowed position and in which at least a portion of the example actuator assembly extends through the notches in the first and second flaps.

FIG. 15 is a cross-sectional view taken along line G-G of FIG. 14.

Figure 1:
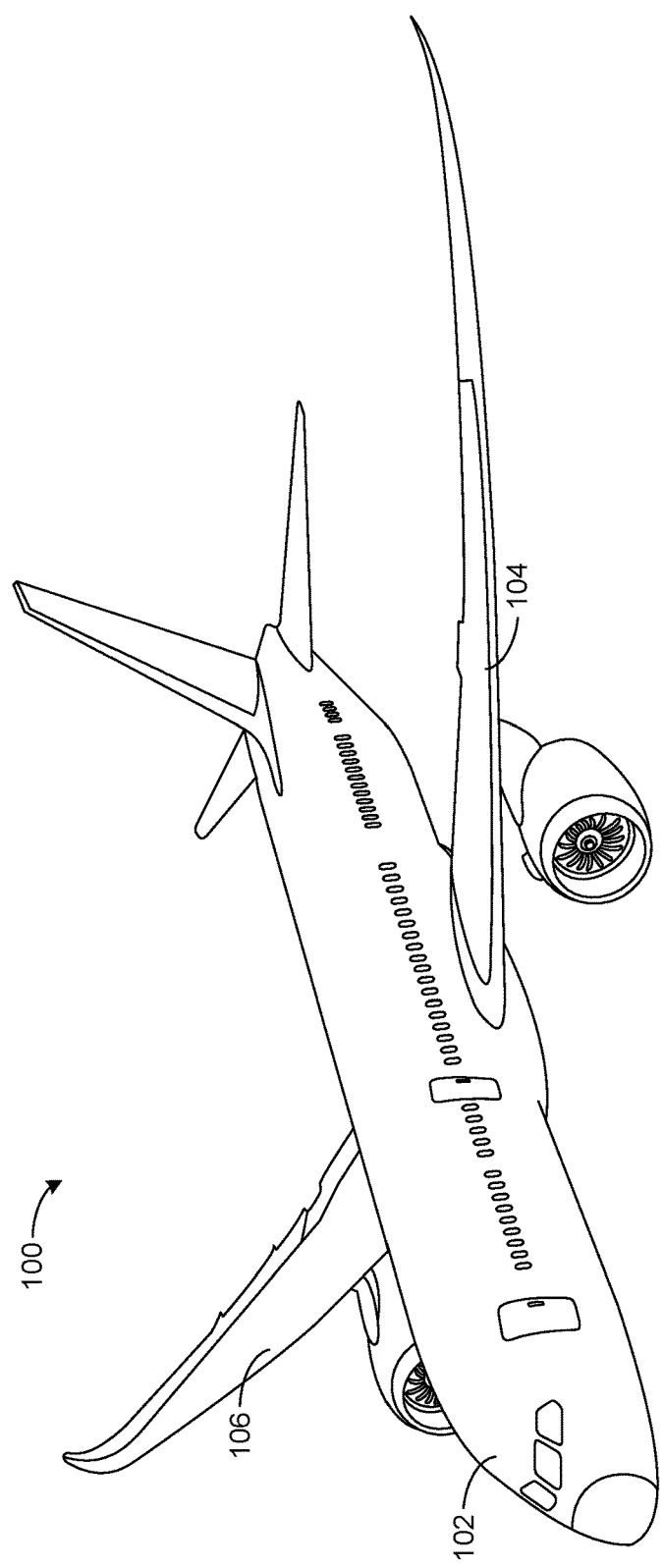
FIG. 1 illustrates an example aircraft in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example actuator assemblies to deploy aircraft leading edge flaps (commonly referred to as Krueger flaps). Example actuator assemblies disclosed herein move a Krueger flap along a more aerodynamic path that results in reduced loads on the Krueger flap compared to known actuator assemblies. Also disclosed herein are example seals that may be used to cover a notch in a top panel of a Krueger flap while the Krueger flap is in the deployed position, thereby increasing the aerodynamic effectiveness of the Krueger flap in the deployed position.

In general, a Krueger flap is a type of leading edge high lift device (e.g., a panel or surface) that is swung from a bottom side of the wing to a deployed position in front of a leading edge of the wing. In the deployed position, the Krueger flap is disposed in front of the leading edge of the wing, which changes the angle of attack of the wing and increases the wing chord to affect the aerodynamic lift during takeoff and landing. The Krueger flap can also be used to reduce the stall speed. In known Krueger flap systems, the Krueger flap is stored in the bottom side of the wing in an upside-down position. In particular, the bottom side of the wing includes an opening for the Krueger flap, and the Krueger flap is positioned upside-down such that a top surface of the Krueger flap is aligned with the bottom side of the wing to form a substantially smooth bottom surface of the wing. Then, when the Krueger flap is to be deployed, an actuator assembly of the Krueger flap system swings the Krueger flap along an arc-shaped path from the bottom side of the wing to the deployed position out in front of the leading edge of the wing. While moving the Krueger flap to the deployed position, the actuator assembly turns the Krueger flap over such that the top surface (previously facing downward in the stowed position) of the Krueger flap is then facing upward. Although effective, known Krueger flap systems have many drawbacks. First, when moving the Krueger flap between the stowed and deployed positions, the Krueger flap is temporarily positioned with its top surface (or broadside) perpendicular to the airflow (sometimes referred to as the "barn door" condition), which creates high loads/resistance on the Krueger flap. Thus, known Krueger flap systems require higher powered actuators that are relatively heavy and expensive.

Another drawback of known Krueger flap systems is that the top surface of the Krueger flap, which is generally desired to have a large curvature or camber, has to form the bottom side of the wing in the stowed position. As such, the top surface of the Krueger flap has to be relatively flat to match the bottom side of the wing that is designed for cruise condition. This significantly limits the amount of curvature for the top surface of the Krueger flap and, thus, affects the amount of lift that can be generated with known Krueger flaps. To overcome this drawback, some known Krueger flaps utilize an additional curved surface, known as a bullnose, that is hingeably coupled to the leading edge of the Krueger flap. As the Krueger flap is deployed, the bullnose is swung outward to provide the Krueger flap more curvature. However, these bullnose designs are complex and require additional actuating mechanisms or links to deploy the bullnose, which further add weight and cost to the system. Additionally, large bullnoses are difficult to integrate because they are stored inside the wing and therefore require additional space inside the wing.

Other known Krueger flaps, known as variable camber Krueger flaps, have an additional mechanism that that flexes the top surface of the Krueger flap outward once in the deployed position to create more curvature along the top surface of the Krueger flap. However, variable camber Krueger flaps require an additional mechanism to create the curved surface, which results in additional parts, weight and costs. In some instances, each of the two mechanisms (one that deploys the flap and one that flexes the flap) has 10 kinematic joints. Further, the large number of links can be difficult to integrate because all of the links must fold up into the wing in the stowed position.

Further, known actuator assemblies for Krueger flaps are often complex and require many components. Some known actuator assemblies include 13 kinematic joints. Also, because known actuator assemblies only rotate the Krueger flap along a simple arc, the distance the Krueger flap can be deployed ahead of the wing is limited. Thus, a desire to create more of a gap or a greater height between the flap and the leading edge of the wing may be impractical.

Disclosed herein are example flap systems and example actuator assemblies for moving a leading edge flap (a Krueger flap) between a stowed position and a deployed position. The example actuator assemblies disclosed herein utilize fewer components (e.g., links or arms) than known actuator assemblies and, thus, are simpler, lighter, smaller, and less expensive than known actuator assemblies. Further, the example actuator assemblies disclosed herein move a Krueger flap through a motion that avoids the perpendicular ("barn door") condition discussed above. As such, the example actuator assemblies can utilize smaller, lighter and less expensive actuators (e.g., a gear rotary actuator (GRA)). In some examples, the actuator assemblies disclosed herein utilize a 6-bar linkage assembly that translates the Krueger flap along an arc-shaped path but does not flip the Krueger flap like in known actuator assemblies. Instead, the Krueger flap is stored in the wing with its bottom surface facing downward and its top surface facing upward. The example actuator assemblies move the Kruger flap along an arc-shaped path while maintaining the leading edge or nose of the Krueger flap pointing substantially forward, which is more aerodynamic. As such, the air flowing past the Krueger flap creates less loads and forces on the Krueger flap than in known Krueger flap systems.

Also, by storing the Krueger flap in the wing with its bottom surface facing downward (and forming part of the bottom side of the wing), the top surface (the lift surface) of the Krueger flap can be designed without limitation because the top surface does not form a bottom flat surface of the wing. As such, the top surface of the Krueger flap can be designed with a larger curvature or camber, which achieves better aerodynamic affects (e.g., more lift) in the deployed position compared to known Krueger flaps. This larger curvature or camber can also be used to enhance performance at lower speeds. Further, because the top surface of the example Krueger flap can be designed with a larger curvature or camber, the example flap systems do not require additional mechanisms such as a bullnose or a flexing mechanism as seen in the known flap systems above. Also, because the top surface of the flap is hidden inside of the wing when stowed, other structures such as humps or fins can be used on the top surface of the flap.

Further, the example actuator assemblies disclosed herein have fewer links or arms than known actuator assemblies. In some examples, the actuator assemblies utilize a crank or output arm of a GRA as one of the links that form the 6-bar linkage. In known actuator assemblies, additional arms and links are typically required used to transfer rotating power between a power unit and one of the arms of the linkage assembly. Thus, the example actuator assemblies utilize fewer parts and components than known assemblies. As such, the example actuator assemblies are less expensive to manufacture and assemble and are lighter than known actuator assemblies, which increases the efficiency of the aircraft. Also, the example flap systems are lighter and less expensive than other leading edge high lift devices such as leading edge slats and drooped leading edges. Furthermore, the example actuator assemblies disclosed herein can be tailored to have more or less gap between the trailing edge of the Krueger flap and the leading edge of the wing in the deployed position.

Also disclosed herein are example seals that may be used to cover a notch in a top surface of a Krueger flap in the deployed position. In some examples, the Krueger flap includes a notch or opening formed in the top surface of the flap. In the stowed position, one or more arms of the actuator assembly extend through the notch and are coupled to an inside of the flap. However, in the deployed position, the arms extend outwardly from a bottom of the flap, which leaves the notch open on the top surface of the flap. To decrease drag that may potentially be created by the open notch, example seals are disclosed herein that may be used to cover the notch when the Krueger flap is in the deployed position. In the stowed position, the seal is moved out of the way and allows the arm(s) of the actuator assembly to extend through the notch. However, in the deployed position, the seal moves to cover the notch and form a substantially smooth upper surface. In some examples, the seal is moveable between a closed position where the seal covers the notch and an open position where the seal is moved out of the notch. In some examples, the seal is constructed of an elastomeric material and may be deformed or compressed.

FIG. 1 illustrates an example aircraft 100 in which the examples disclosed herein may be implemented. In the illustrated example, the aircraft 100 includes a fuselage 102, a first wing 104 coupled to the fuselage 102, and a second wing 106 coupled to the fuselage 102. The first and second wings 104, 106 may have one or more control surfaces such as high lift devices (e.g., auxiliary airfoils) that are located long the leading and trailing edges of the first and second wings 104, 106. Such high lift devices may be displaced or extended from the lead or trailing edges of the first and second wings 104, 106 to change the aerodynamic lift of the aircraft 100 and are typically used during takeoff and landing. For example, when extended from the first and second wings 104, 106, the high lift devices increase the effective size, curvature camber and area of the first and second wings 104, 106, thereby increasing the lift of the first wing 104.

Figure 2:
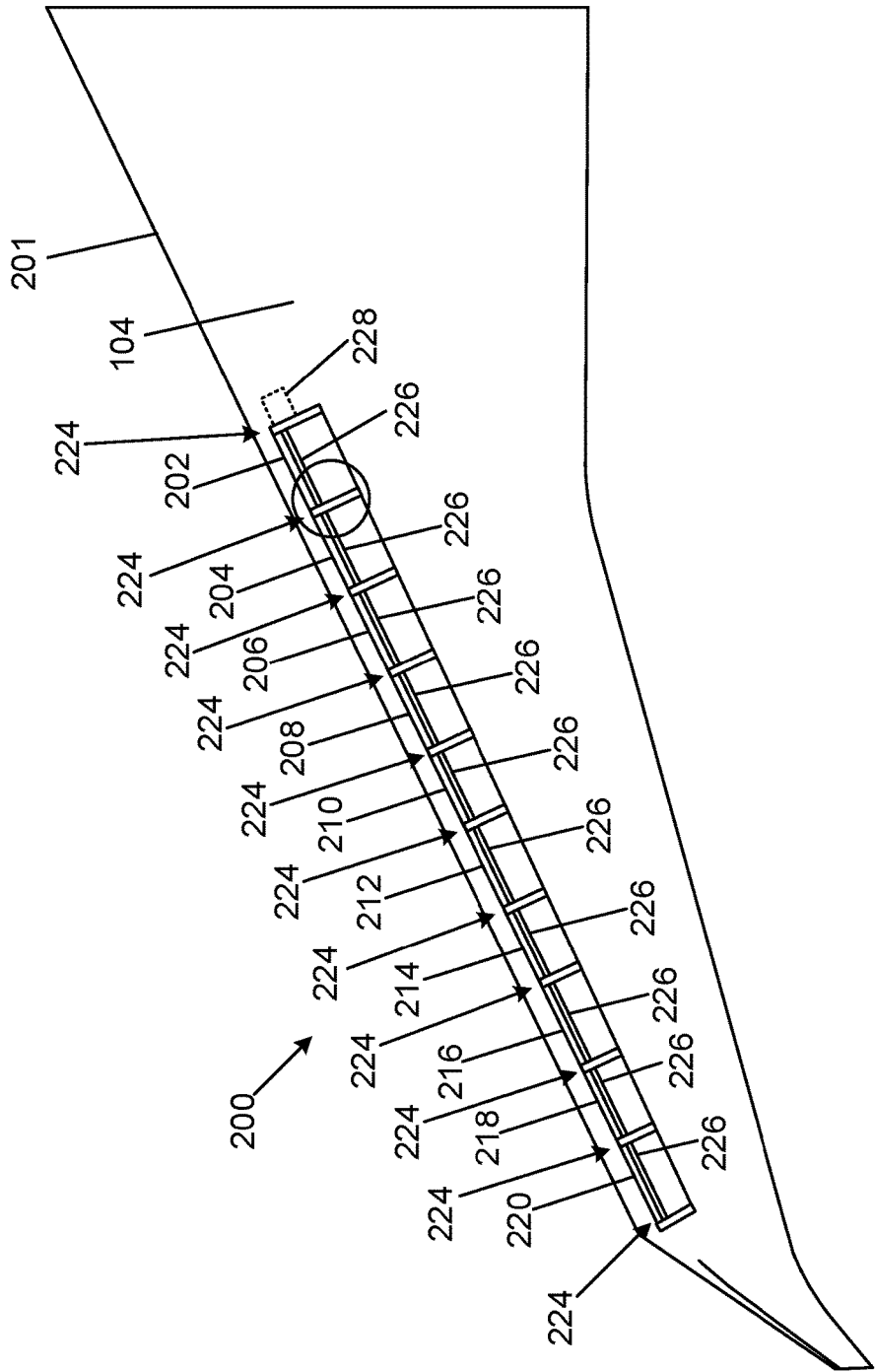
FIG. 2 illustrates one of the wings of the example aircraft of FIG. 1 having an example flap system with a row of example flaps and example actuator assemblies.

FIG. 2 illustrates an example flap system 200 that may be implemented in the first wing 104. In the illustrated example, the first wing 104 is shown as transparent to expose the flap system 200 disposed within the first wing 104. The example flap system 200 includes a plurality of leading edge flaps (also referred to herein as Krueger flaps) disposed along a leading edge 201 of the first wing 104 and a plurality of actuating mechanisms to move the flaps between a stowed position and an extended or deployed position to change the chamber of the first wing 104 as disclosed in further detail herein. In the illustrated example, the flap system 200 includes ten flaps: a first flap 202, a second flap 204, a third flap 206, a fourth flap 208, a fifth flap 210, a sixth flap 212, a seventh flap 214, an eighth flap 216, a ninth flap 218, and a tenth flap 220. The flaps 204-220 are aligned next to each other and are moved in unison to form a substantially unitary structure (e.g., a surface or panel) that can be deployed in front of the leading edge 201 of the first wing 104. The example flap system 200 moves the example flaps 202-220 between a stowed position, in which the flaps 202-220 are stored within the first wing 104, and a deployed position, in which the flaps 202-220 are positioned in front of and/or below the leading edge 201 of the first wing 104. The flaps 202-220 may be deployed to enhance laminar flow over the top of the first wing 104. Further, in some examples, the flaps 202-220 can be deployed to protect the leading edge 201 of the first wing 104 from bugs and other debris.

In some examples, each of the flaps 202-220 is about the same width, such as 65 inches (in). In other examples, the flaps 202-220 may be longer or shorter and/or the flap system 200 of the first wing 104 may include more (e.g., eleven, twelve, etc.) or fewer (e.g., nine, eight, etc.) flaps. Additionally, the first wing 104 may include other control surfaces such as ailerons, spoilers, tabs, leading edge slats, trailing edge slats, etc. in addition to the flaps 202-220. The second wing 106 (FIG. 1) may include a similar flap system and/or other control surfaces. To avoid redundancy, the second wing 106 and the corresponding structures are not discussed in further detail. Instead, it is understood that any of the example aspects disclosed in connection with the first wing 104 can likewise be applied to the second wing 106.

In the illustrated example, each of the flaps 202-220 is deployed using two separate but synchronized (e.g., coordinated) example actuator assemblies 224, one on the inboard side and one on the outboard side of each of the flaps 202-220. The actuator assemblies 224 between two of the flaps 202-220 are coupled to and drive the ends of the respective flaps. For example, the actuator assembly 224 between the first flap 202 and the second flap 204 is coupled to and actuates the ends of the first and second flaps 202, 204. Likewise, the actuator assembly 224 between the second flap 204 and the third flap 206 is coupled to and actuates the ends of the second and third flaps 204, 206, and so forth. As such, in the illustrated example, there are eleven actuator assemblies 224.

In the illustrated example, the actuator assemblies 224 are driven by a row of torque tubes 226 extending between adjacent (e.g., an upstream or downstream) ones of the actuator assemblies 224. In the illustrated example, a motor or power drive unit (PDU) 228 drives the torque tubes 226 in unison, which provide rotating power to each of the actuator assemblies 224 to deploy or retract the respective flaps 202-220. For example, referring to FIG. 2, the PDU 228 may drive the actuator assembly 224 (e.g., a first actuator assembly) on the right side of the first flap 202 in FIG. 2. Additionally, an output of this first actuator assembly 224 drives the torque tube 226 that is coupled to the actuator assembly 224 between the first and second flaps 202, 204, an output of which drives the next torque tube 226 coupled to the next actuator assembly 224 between the second and third flaps 204, 206, and so forth. Therefore, the PDU 228 provides driving power to all of the actuator assemblies 224 via the torque tubes 226 along the leading edge 201 of the first wing 104 to deploy or retract the flaps 202-220 in unison. In some examples, the PDU 228 also provides driving power to all of the actuator assemblies for driving the flaps on the second wing 106 (FIG. 1). As a result, all of the flaps along the leading edges of the first and second wings 104, 106 may be deployed simultaneously. In other examples, a separate PDU may be used to drive the flaps on the second wing 106. Further, while in the illustrated example two of the example actuator assemblies 224 are used to move each of the respective flaps 202-220, in other examples, only one actuator assembly or more than two actuator assemblies may be used to deploy or retract one or more the flaps 202-220. Thus, the example flap system 200 may include more or fewer actuator assemblies.

Figure 3A:
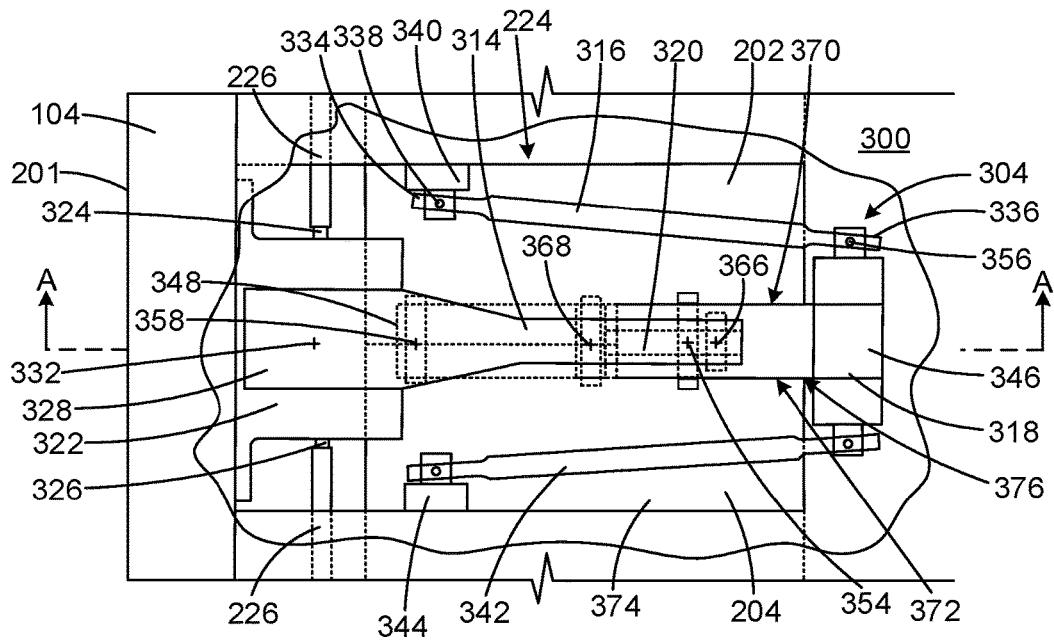
FIG. 3A is a top view of a section of the example wing of FIG. 2 showing a first example flap and a second example flap in a stowed position inside of the example wing and showing an example actuator assembly to deploy or retract the first and second example flaps.
Figure 3B:
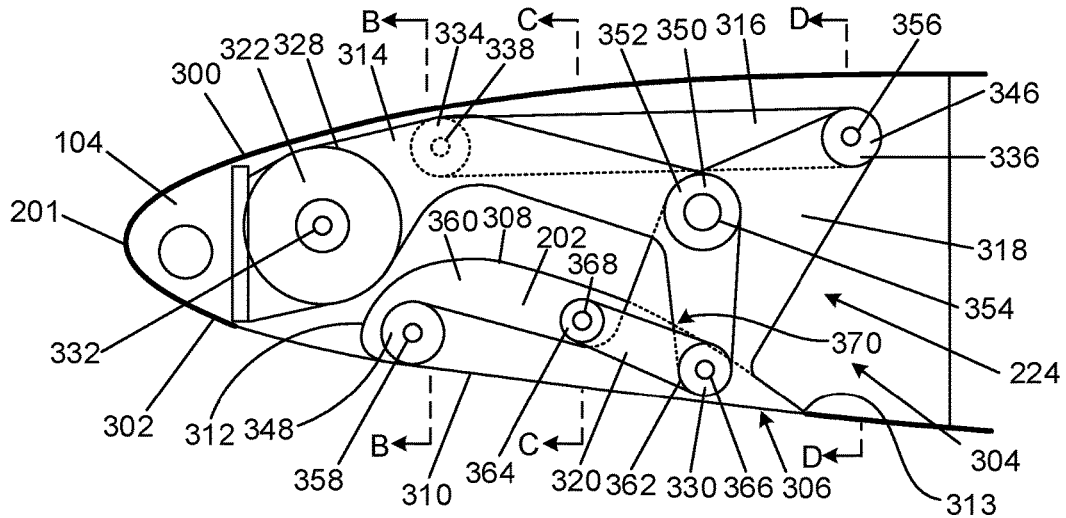
FIG. 3B is a cross-sectional view of the example wing of FIG. 3A taken along line A-A in FIG. 3A showing the example actuator assembly and first example flap in the stowed position inside of the example wing.

FIGS. 3A and 3B illustrate one of the example actuator assemblies 224 constructed in accordance with one or more principles of this disclosure. In particular, FIG. 3A shows a top view of the section of the first wing 104 shown in FIG. 2, and FIG. 3B illustrates a cross-sectional or side view of the same section of the wing of FIG. 3A taken along line A-A. In FIG. 3B, only the first flap 202 can be seen. The example actuator assembly 224 of FIGS. 3A and 3B is substantially the same as the other example actuator assemblies 224 of FIG. 2. Thus, the disclosure relating to the example actuator assembly 224 in connection with the first and second flaps 202, 204 of FIGS. 3A and 3B can likewise be applied to any of the other example actuator assemblies 224 and the other example flaps 206-220 of FIG. 2.

In the illustrated example of FIGS. 3A and 3B, the first and second flaps 202, 204 are in a stowed position and disposed within the first wing 104. The first and second flaps 202, 204 (as well as the other flaps 206-220 of FIG. 2) are movable between the stowed position (FIGS. 3A and 3B) and a deployed position (shown and described in further connection with FIGS. 7A and 7B). In the illustrated example of FIGS. 3A and 3B, the first wing 104 is defined by an upper surface panel 300, a lower surface panel 302, and the leading edge 201. In the illustrated example, the leading edge 201 has a rounded or curved profile to reduce drag. In the stowed position, the first and second flaps 202, 204 (as well as the other flaps 206-220 in FIG. 2) are disposed within a cavity 304 formed between the upper surface panel 300 and the lower surface panel 302 near the leading edge 201 of the first wing 104. The lower surface panel 302 includes an opening 306 (FIG. 3B) where the first and second flaps 202, 204 (as well as the other flaps 206-220 of FIG. 2) can move into and out of the cavity 304. In the stowed position, a bottom side of the first and second flaps 202, 204 (as well as the other flaps 206-220 of FIG. 2) are aligned within the opening 306. For example, as illustrated in FIG. 3B, the first flap 202 has a top panel 308 (e.g., a top surface, a lift surface, etc.), a bottom panel 310, a leading edge 312 and a trailing edge 313. As illustrated in FIG. 3B, the bottom panel 310 of the first flap 202 is substantially aligned with the opening 306 in the lower surface panel 302 of the first wing 104. Thus, when the first flap 202 is in the stowed position (which accounts for a majority of the flight time during cruise), the bottom panel 310 of the first flap 202 forms a substantially smooth bottom surface of the first wing 104. The second flap 204 and the other flaps 206-220 in FIG. 2 include similar surfaces and are likewise arranged in the same stowed position. In some examples, all of the flaps 202-220 (FIG. 2) have substantially the same chord length, such as 10 inches. In other examples, the flaps 202-220 may have longer or shorter chord lengths and/or the chord lengths may be different than each other. For example, the inboard flaps, such as the first flap 202, may have a larger chord length than the outboard flaps, such as the tenth flap 220 (FIG. 2).

The actuator assembly 224 includes a plurality of links or arms that, when actuated, move the first and second flaps 202, 204 between the stowed position (FIGS. 3A and 3B), the deployed position (FIGS. 7A and 7B), and any position therebetween. In the illustrated example, the actuator assembly 224 is disposed between and coupled to both the first flap 202 and the second flap 204. As such, the actuator assembly 224 moves the first and second flaps 202, 204 in unison. However, in other examples, the actuator assembly 242 may be coupled to only one flap. For example, referring briefly back to FIG. 2, the actuator assembly 242 on the far right of FIG. 2 is only coupled to the inboard side of the first flap 202. Likewise, on the far left of FIG. 2, the last actuator assembly 242 is only coupled to the outboard side of the tenth flap 220. In some examples, the far right and far left actuator assemblies may be substantially the same as the actuator assembly 224 illustrated in FIGS. 3A and 3B. In the other examples, the actuator assemblies 224 on the far right and left may be sectioned such that the actuator assemblies 224 are half the width as shown in FIG. 3A (e.g., the structures above line A-A in FIG. 3A).

In the illustrated example of FIGS. 3A and 3B, the example actuator assembly 224 includes an actuating arm 314 (e.g., a first arm or link), a first swing arm 316 (e.g., a second arm or link), a tilt arm 318 (e.g., a third arm or link), and a kicker arm 320 (e.g., a fourth arm or link). As disclosed in further detail herein, the actuating arm 314 and the first swing arm 316 are coupled to the first wing 104, and the tilt arm 318 and the kicker arm 320 are coupled to the first and second flaps 202, 204. The following six structures: (1) the first wing 104 (e.g., forming the base or ground), (2) the actuating arm 314, (3) the first swing arm 316, (4) the tilt arm 318, (5) the kicker arm 320, and (6) the first and second flaps 202, 204 form a 6-bar linkage that translates the first and second flaps 202, 204 between the stowed position and the deployed position (and/or any position therebetween). An example sequence showing actuation of the 6-bar linkage is illustrated in FIGS. 8A-8J and discussed in further detail herein. In the stowed position shown in FIG. 3B, the actuator assembly 224 is disposed within the cavity 304 of the first wing 104. Thus, in this example, none of the actuator assembly 224 is disposed outside of the first wing 104 where it may cause aerodynamic drag.

To drive the arms 314, 316, 318, 320 and move the first and second flaps 202, 204, the example actuator assembly 224 includes a geared rotary actuator (GRA) 322. In the illustrated example, the actuating arm 314 is the crank or output arm of the GRA 322 and the GRA 322 operates to rotate the actuating arm 314 to move the other arms 316, 318, 320 and, thus, move the first and second flaps 202, 204 between the stowed position and the deployed position. The GRA 322 is powered by one of the torque tubes 226. In particular, as illustrated in FIG. 3A, the GRA 322 has an upstream or input shaft 324 that is coupled to an upstream one of the torque tubes 226 and a downstream or output shaft 326 coupled to a downstream one of the torque tube 226. The GRA 322 contains a gear train (e.g., a system of gears, a transmission, etc.) that is used to change the torque and rotational rate applied to the actuating arm 314 by the upstream one of the torque tubes 226. In general, the PDU 228 (FIG. 2) spins at a relatively fast speed (e.g., about 700 revolutions per minute (RPM)). The GRA 322 reduces the rotational speed provided to the actuating arm 314 and, thus, increases the torque provided to the actuating arm 314. The output shaft 326 rotates the downstream one of the torque tubes 226 at the relatively high speed, thereby providing power to the next, downstream actuator assembly. In the illustrated example, the GRA 322 is disposed within the cavity 304 near the leading edge 201 of the first wing 104. In other examples, the GRA 322 may be disposed in other locations. In some examples, the GRA 322 has a diameter of about 3.2 in. In other examples, the GRA 322 may have a larger or smaller diameter.

In the illustrated example, the actuating arm 314 is bent or curved (e.g., has an "L" shape) and has a first end 328 and a second end 330 (FIG. 3B) (e.g., a distal end). The first end 328 of the actuating arm 314 is rotatably coupled to the first wing 104 via the GRA 322, which forms a first joint 332. The first swing arm 316 includes a first end 334 and a second end 336. The first end 334 of the first swing arm 316 is rotatably coupled to the first wing 104 at a second joint 338. In particular, referring to FIG. 3A, the first end 334 of the first swing arm 316 is rotatably coupled to a first rib 340 in the first wing 104. In the illustrated example, the GRA 322 is disposed in the cavity 304 of the first wing 104 closer to the leading edge 201 than the first end 334 of the first swing arm 316. In some examples, this configuration allows more space within the cavity 304 to accommodate the first and second flaps 202, 204. In the illustrated example, the second end 336 of the first swing arm 316 is rotatably coupled to the tilt arm 318 as disclosed in further detail below. As also illustrated in FIG. 3A, the actuator assembly 224 includes a second swing arm 342, which is similarly coupled between a second rib 344 in the first wing 104 and the other side of the tilt arm 318. In some examples, the addition of the second swing arm 342 helps balance the actuator assembly 224. However, in other examples, only one of the first or second swing arms 316, 342 may be utilized.

In the illustrated example of FIGS. 3A and 3B, the actuating arm 314 and the first and second swing arms 316, 342 are rotatably coupled to the tilt arm 318. The tilt arm 318 is curved or bent and has a first end 346 and a second end 348. In the illustrated example, an intermediate point 350 (FIG. 3B) on the actuating arm 314 (e.g., a point between the first end 328 and the second end 330 of the actuating arm 314) is rotatably coupled to an intermediate point 352 (FIG. 3B) on the tilt arm 318 (e.g., a point between the first end 346 and the second end 348 of the tilt arm 318) at a third joint 354. In the illustrated example, the intermediate point 350 on the actuating arm 314 is at or near the bend in the actuating arm 314. In other examples, the intermediate point 350 of the actuating arm 314 may be in other locations of the actuating arm 314.

As illustrated in FIGS. 3A and 3B, the second end 336 of the first swing arm 316 is rotatably coupled to the first end 346 of the tilt arm 318 at a fourth joint 356. Likewise, as illustrated in FIG. 3A, the second swing arm 342 is also rotatably coupled to the first end 346 of the tilt arm 318 at the fourth joint 356 (e.g., on an opposite side of the tilt arm 318 as the first swing arm 316). In the illustrated example, the second end 348 of the tilt arm 318 is coupled to the first and second flaps 202, 204 near the leading edges of the first and second flaps 202, 204 at a fifth joint 358 (e.g., a forward flap attachment). As seen more clearly in FIG. 3B, the tilt arm 318 extends along the lower surface of the first flap 202 and is rotatably coupled to a side wall 360 of the first flap 202 near the leading edge 312 of the first flap 202. The second end 348 of the tilt arm 318 is similarly coupled to a matching side on the second flap 204.

In the illustrated example, the actuating arm 314 is rotatably coupled to the first and second flaps 202, 204 via the kicker arm 320. In particular, as illustrated in FIG. 3B, the kicker arm 320 has a first end 362 and a second end 364. The first end 362 of the kicker arm 320 is rotatably coupled to the second end 330 of the actuating arm 314 at a sixth joint 366. The second end 364 of the kicker arm 320 is rotatably coupled to the first and second flaps 202, 204 at a seventh joint 368 (e.g., an aft flap attachment), which is closer to a trailing edge of the first and second flaps 202, 204 than the fifth joint 358. For example, as seen more clearly in FIG. 3B, the second end 364 of the kicker arm 320 is rotatably coupled to the side wall 360 of the first flap 202 closer to the trailing edge than the fifth joint 358. As described above, the example actuator assembly 224 is formed by seven joints. Any of the example joints 332, 338, 354, 356, 358, 366, 368 may be formed by a pin extending between the corresponding structures forming the respective joint. In other examples, the corresponding structures may be rotatably coupled via other mechanisms. In some examples, the arms 314-320 of the actuator assembly 242 are constructed of a relatively light and stiff material, such as aluminum. In other examples, the arms 314-320 may be constructed of other suitable materials, such as steel, carbon fiber, etc.

Figure 4:
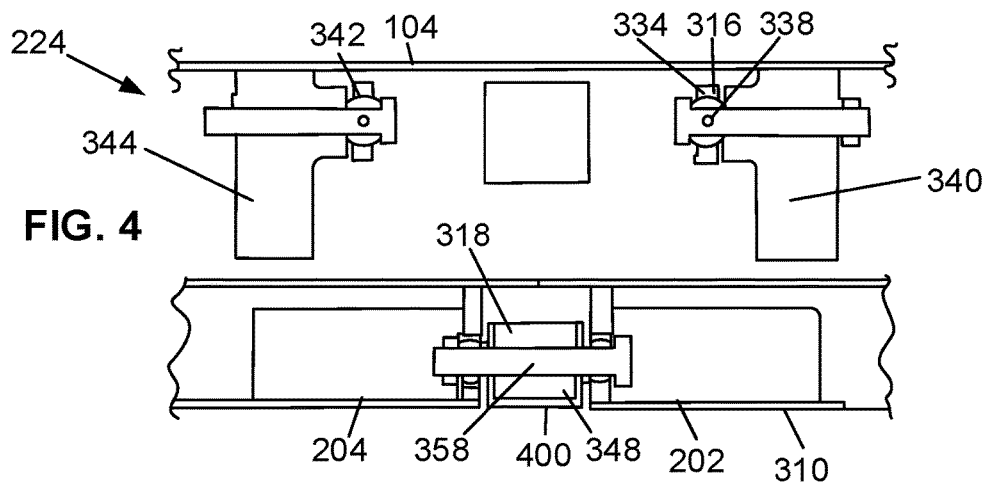
FIG. 4 is a cross-sectional view of the example wing of FIGS. 3A and 3B taken along line B-B in FIG. 3B.
Figure 5:
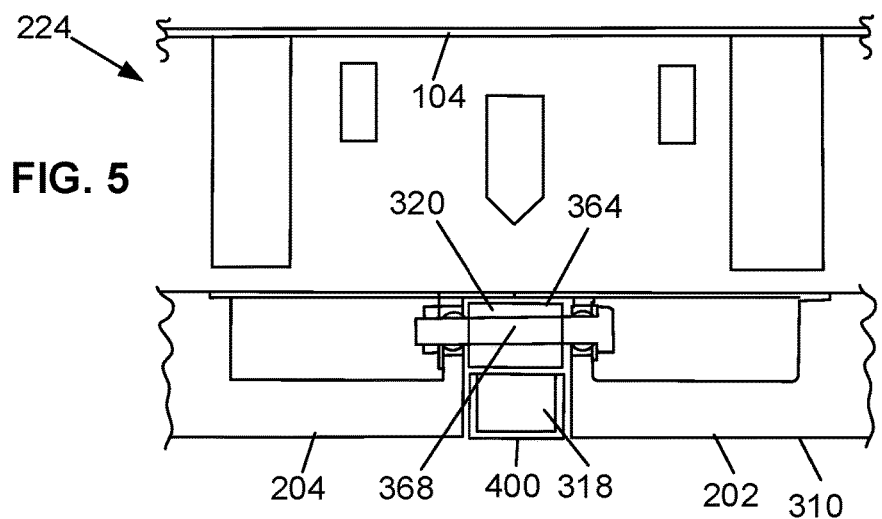
FIG. 5 is a cross-sectional view of the example wing of FIGS. 3A and 3B taken along line C-C in FIG. 3B.
Figure 6:
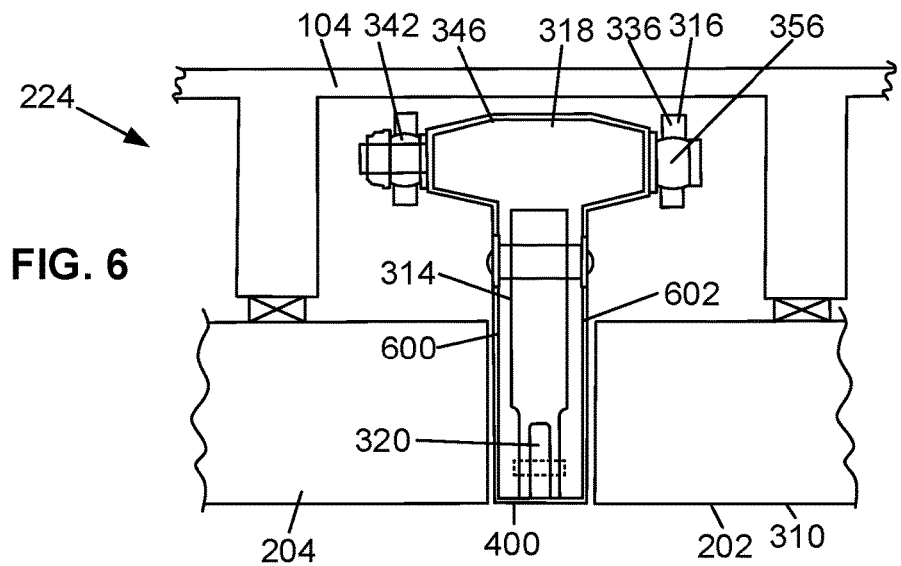
FIG. 6 is a cross-sectional view of the example wing of FIGS. 3A and 3B taken along line D-D in FIG. 3B.

FIGS. 4-6 are cross-sectional views of the first wing 104 of FIGS. 3A and 3B showing the example actuator assembly 224 and the first and second flaps 202, 204 in the first wing 104. In particular, FIG. 4 is a cross-sectional view taken along line B-B in FIG. 3B. As shown in FIG. 4, the first end 334 of the first swing arm 316 is rotatably coupled to the first rib 340 in the first wing 104 at the second joint 338. Similarly, the second swing arm 342 is rotatably coupled to the second rib 344 in the first wing 104 (e.g., along the same axis as the second joint 338). As mentioned above, in some examples, only one of the first or second swing arms 316, 342 may be implemented. Also shown in FIG. 4 is the second end 348 of the tilt arm 318 rotatably coupled to the first flap 202 and the second flap 204 at the fifth joint 358.

FIG. 5 is a cross-sectional view taken along line C-C in FIG. 3B. As shown, the second end 364 of the kicker arm 320 is rotatably coupled to the first flap 202 and the second flap 204 at the seventh joint 368. FIG. 6 is a cross-sectional view taken along line D-D in FIG. 3B. As illustrated, the second end 336 of the first swing arm 316 is rotatably coupled to the first end 346 of the tilt arm 318 at the fourth joint 356. Likewise, the second swing arm 342 is rotatably coupled to the other side of the tilt arm 318 at the fourth joint 356 (e.g., via a same pin). However, as mentioned above, in other examples, only one of the first or second swing arms 316, 342 may be utilized.

As illustrated in FIG. 6, the tilt arm 318 is formed by two side walls 600, 602 (e.g., parallel side walls) defining a gap therebetween. At least a portion of the actuating arm 314 extends between the two side walls 600, 602. In the stowed position, as shown in FIG. 6, the kicker arm 320 is also at least partially disposed between the two side walls 600, 602. As such, the actuating arm 314, the tilt arm 318, and the kicker arm 320 move along the same plane. In other examples, the tilt arm 318 may not be constructed of two parallel walls. Instead, the actuating arm 314 and the tilt arm 318 can be offset, such that they are disposed along and move through different planes.

As shown in the cross-sectional views of FIGS. 4-6, in the stowed position, the tilt arm 318 extends between the first and second flaps 202, 204. A bottom wall 400 of the tilt arm 318 is substantially aligned with the bottom panel 310 of the first flap 202 and the corresponding bottom panel of the second flap 204. Thus, when the first and second flaps 202, 204 are in the stowed position, the bottom sides of the first and second flaps 202, 204 and the bottom wall 400 of the tilt arm 318 fill the opening 306 (FIG. 3B) in the lower surface panel 302 (FIG. 3B) of the first wing 104 and, thus, form a substantially smooth surface along the bottom side of the first wing 104.

Referring briefly back to FIGS. 3A and 3B, in the stowed position, the actuator assembly 224 extends through a first notch 370 in the top panel 308 of the first flap 202. Likewise, a second notch 372 is formed in a second top panel 374 through which the actuator assembly 224 extends. The first and second notches 370, 372 face each other and form a slot 376 through which the actuator assembly 224 moves, as disclosed in further detail herein. In some examples, the width of the tilt arm 318 is substantially the same as width of the slot 376. For example, the first and second notches 370, 372 may be about 0.75 inches wide (thereby forming a slot of about 1.50 inches), and the tilt arm 318 may be about 1.50 inches wide. In other examples, the dimensions of the first and/or second notches 370, 372 and/or the width of the tilt arm 318 may be larger or smaller.

FIGS. 7A and 7B are similar views as FIGS. 3A and 3B, respectively, showing the first and second flaps 202, 204 in the deployed or extended position. As shown, the first and second flaps 202, 204 are positioned in front of the leading edge 201 of the first wing 104 at an angle that enhances laminar airflow over the upper surface panel 300 of the first wing 104. Thus, the first and second flaps 202, 204 (as well as the other flaps 206-220 of FIG. 2) can be deployed to change the aerodynamic lift of the first wing 104. Further, in some examples, the first and second flaps 202, 204 (as well as the other flaps 206-220 of FIG. 2) can be deployed to protect the leading edge 201 of the first wing 104 from bugs and/or other debris. In the illustrated example, the actuating arm 314 and the first and second swing arms 316, 342 extend through the opening 306 (FIG. 7B) in the lower surface panel 302. As illustrated in FIG. 7B, the actuator assembly 224 extends outward from the bottom panel 310 of the first flap 202.

As illustrated in FIGS. 7A and 7B, the first and second flaps 202, 204 are spaced apart from the leading edge 201 of the first wing 104. In other examples, the arms 314, 316, 318, 320 may be longer or shorter to position the first and second flaps 202, 204 closer to or further from the leading edge 201. In some examples, the actuator assembly 224 is designed to position the trailing edge of the first and second flaps 202, 204 at or near the leading edge 201. In some examples, different ones of the actuator assemblies 224 are designed to position the respective flaps 202-220 (FIG. 2) in different positions relative to the leading edge 201 of the first wing 104. For example, referring back to FIG. 2, an inboard one of the flaps, such as the first flap 202, may be positioned relatively higher in front of the leading edge 201 than an outboard one of the flaps, such as the tenth flap 220.

Figure 8A:
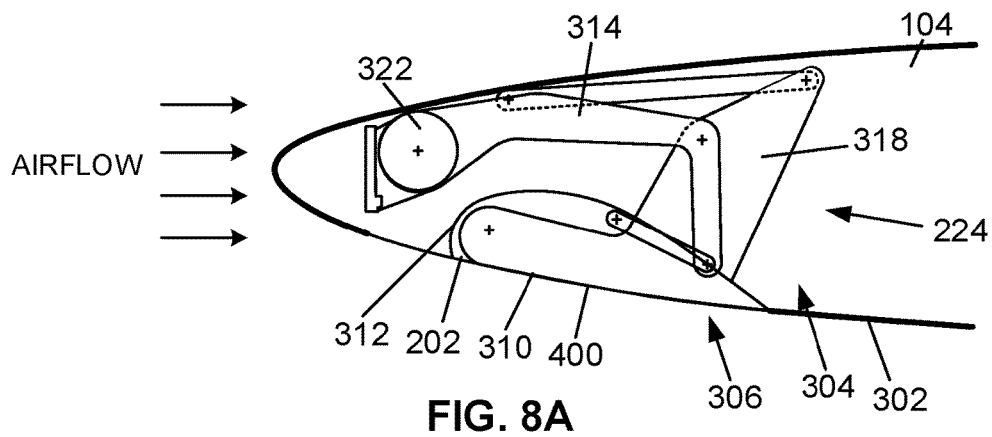
FIGS. 8A-8J illustrate an example sequence showing the example actuator assembly of FIGS. 3A and 3B moving the first example flap between the stowed position and the deployed position.
Figure 8B:
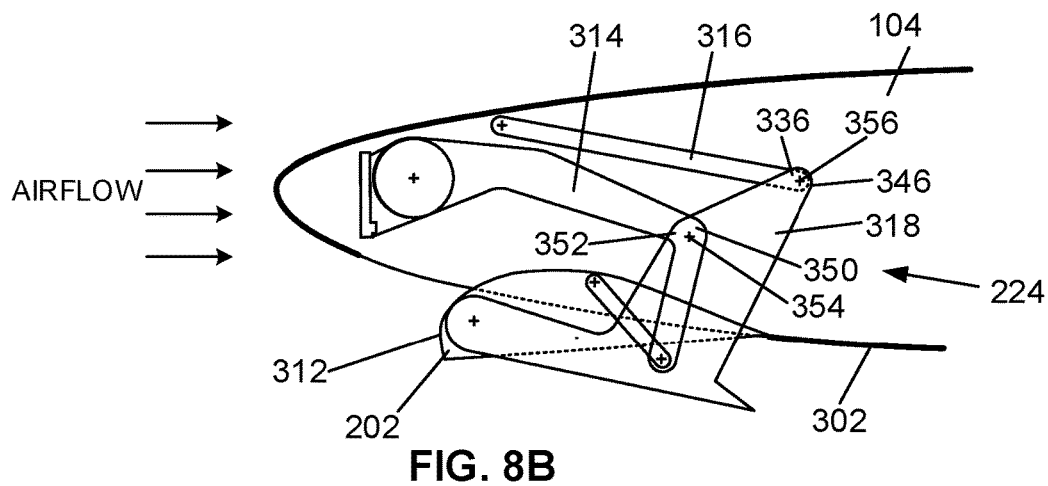
Figure 8C:
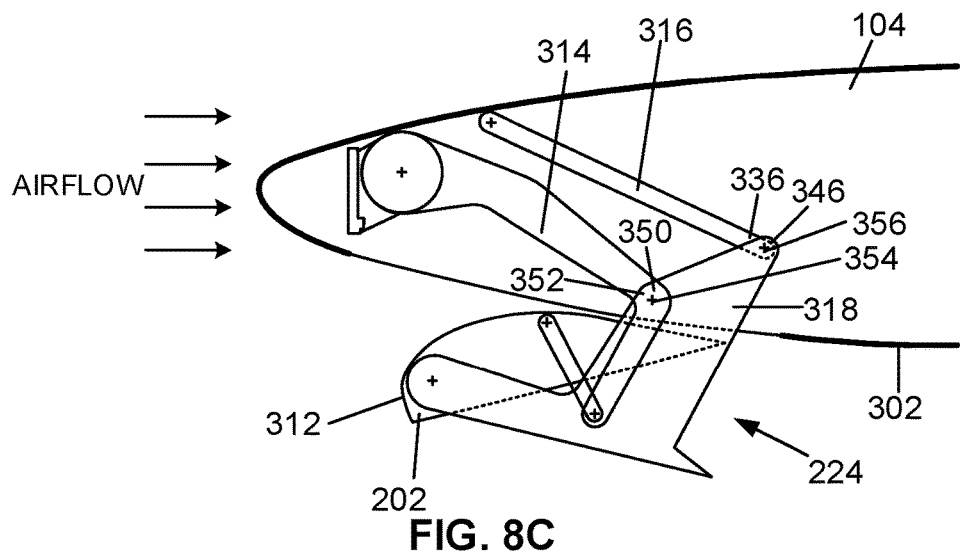
Figure 8D:
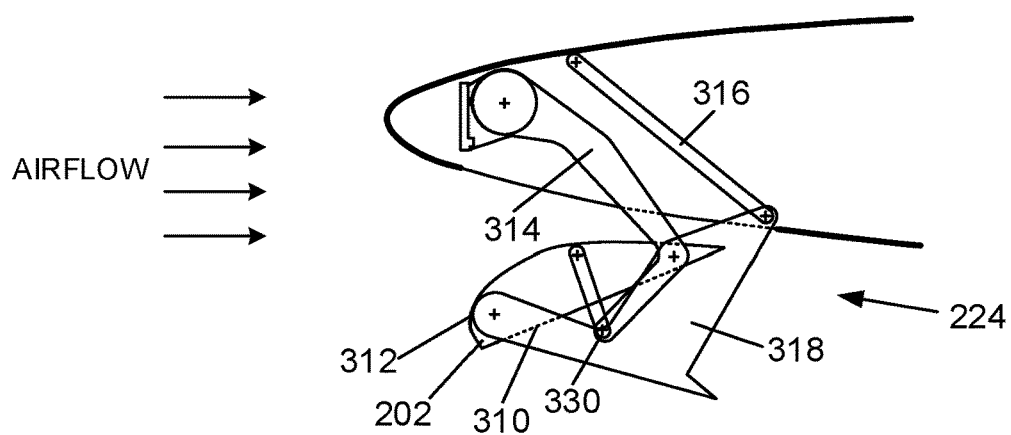
Figure 8E:
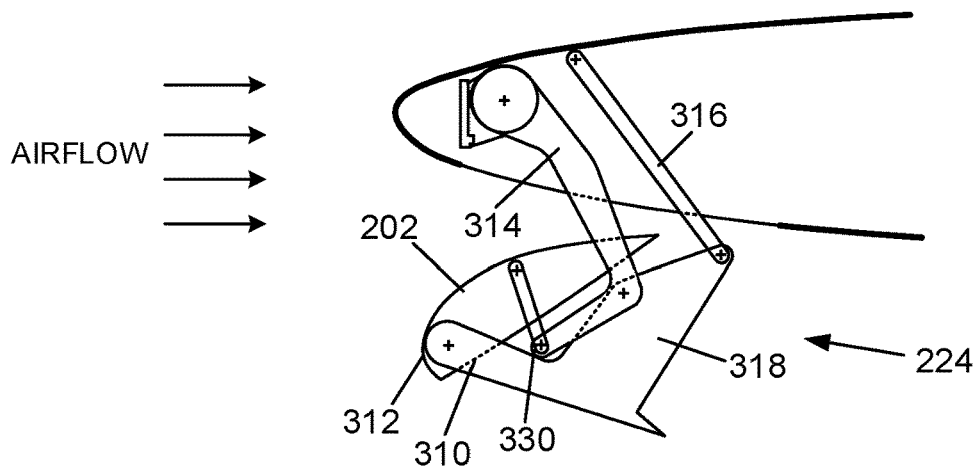
Figure 8F:
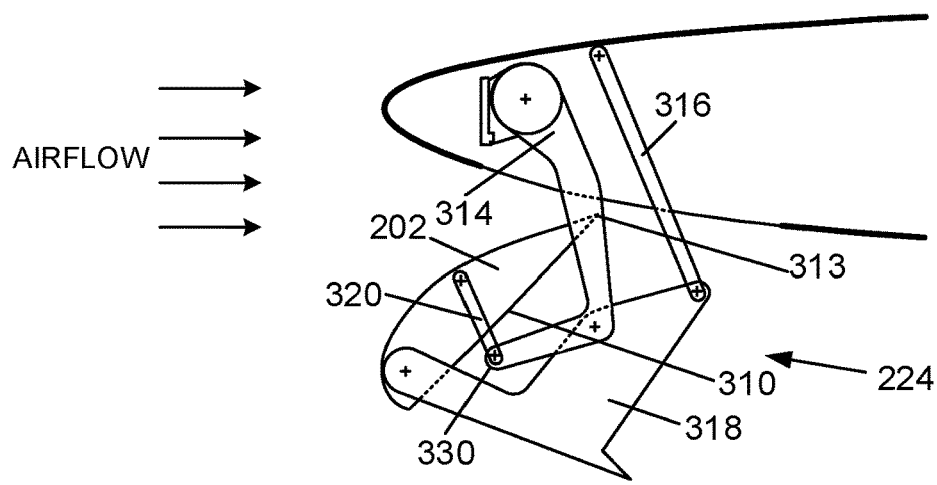
Figure 8G:
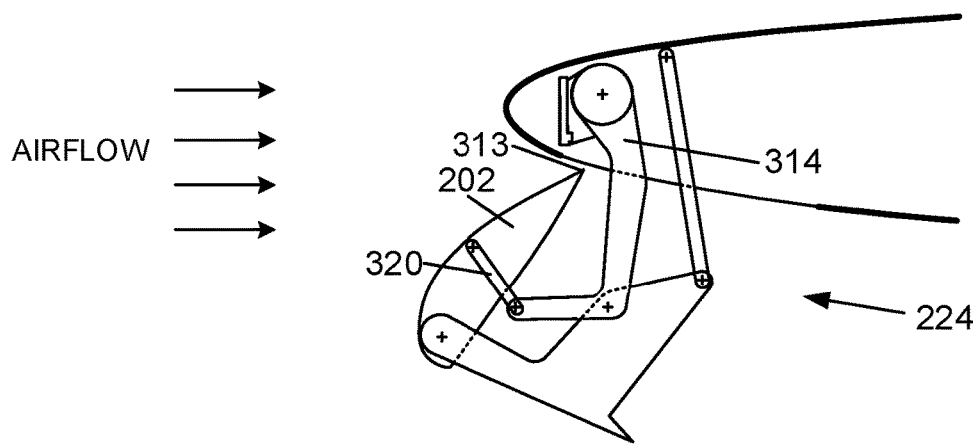
Figure 8H:
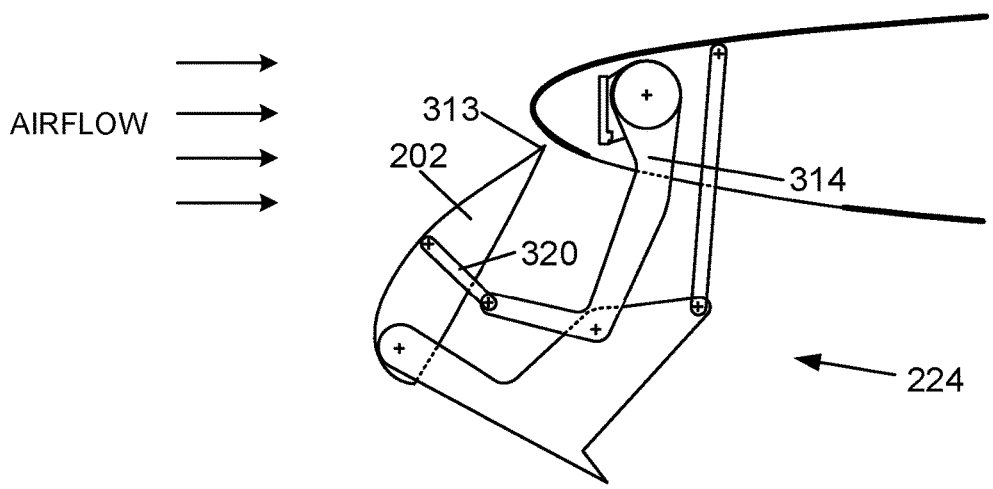
Figure 8I:
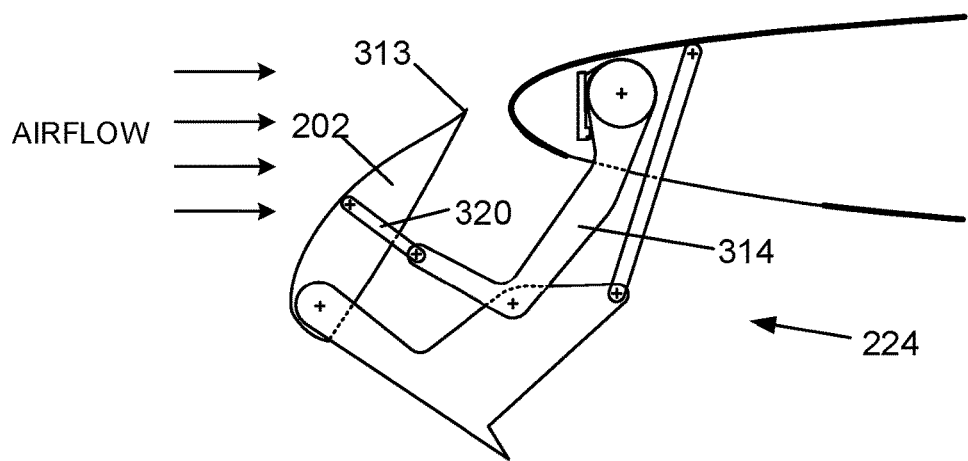
Figure 8J:
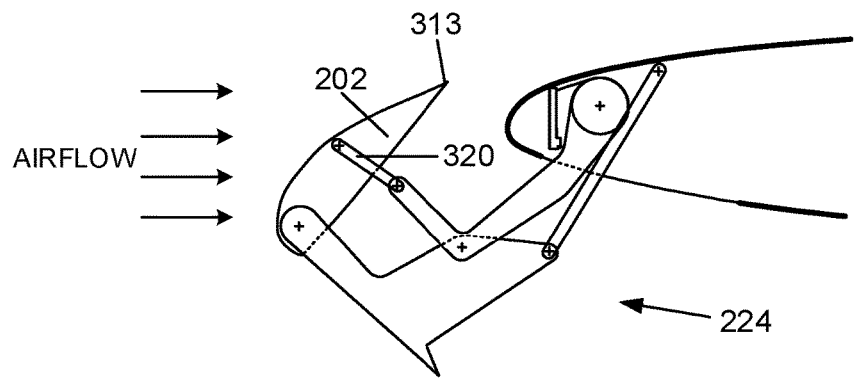

FIGS. 8A-8J illustrate an example sequence showing the actuator assembly 224 moving the first flap 202 from the stowed position to the deployed position. Starting with the stowed position of FIG. 8A, the actuator assembly 224 and the first flap 202 are disposed in the cavity 304 of the first wing 104. The bottom panel 310 of the first flap 202 and the bottom wall 400 of the tilt arm 318 align with the opening 306 to form a substantially smooth surface along the lower surface panel 302 of the first wing 104. To move the first flap 202, the GRA 322, which is powered by one of the torque tubes 226 (FIG. 2), rotates the actuating arm 314 downward (in clockwise direction in FIG. 8A). The actuating arm 314 pushes the tilt arm 318 downward, which moves the tilt arm 318 and the first flap 202 downward from the lower surface panel 302 of the first wing 104, as illustrated in FIGS. 8B and 8C. As illustrated in FIGS. 8B and 8C, the intermediate point 352 on the tilt arm 318 swings along the path of the intermediate point 350 on the actuating arm 314 at the third joint 354. Further, the first end 346 of the tilt arm 318 swings along the path of the second end 336 of the first swing arm 316 (and/or the second swing arm 342 (FIG. 3A)) at the fourth joint 256. Thus, the tilt arm 318 swings along the paths defined by the actuating arm 314 and the first swing arm 316. As shown in FIG. 8D-8F, as the actuating arm 314 and the first swing arm 316 continue to swing the tilt arm 318 (in the clockwise direction in FIGS. 8D-8F), the second end 330 of the actuating arm 314 is moved out of the tilt arm 318 and towards the bottom panel 310 of the first flap 202. In FIGS. 8G-8I, the actuating arm 314 continues to rotate downward (in the clockwise direction), which pushes the kicker arm 320 outward, thereby pushing the trailing edge 313 of the first flap 202 further to the left and causing the first flap 202 to tilt or angle downward (e.g., rotate in the counter-clockwise direction in FIGS. 8G-8I). In FIG. 8J, the first flap 202 reaches the final deployed position.

As illustrated in the example sequence of FIGS. 8A-8J, the example actuator assembly 224 does not swing the first flap 202 through an orientation that is perpendicular to the direction of the airflow (sometimes referred to as a "barn door" condition). As such, the actuator assembly 224 avoids moving the first flap 202 along a path that would otherwise cause increased loads on the first flap 202 and, thus, on the actuator assembly 224. Instead, during a first part of the sequence (such as between FIGS. 8A-8E, for example), the first flap 202 remains substantially horizontal with the leading edge 312 of the first flap 202 facing forward, which is more aerodynamic and easier to move against the airflow. During a second part of the sequence (such as between FIGS. 8F-8J, for example), the kicker arm 320 pushes the trailing edge 313 of the first flap 202 upward/outward, which tilts the first flap 202 to achieve the desired orientation in the deployed position. While the first flap 202 may perform a slight scooping action, the leading edge 312 (referenced in FIGS. 8A-8E) of the first flap 202 provides stability during the movement, as opposed to moving the first flap 202 in a perpendicular manner as seen in known actuator assemblies.

An example method of deploying the first flap 202 may include, for example, actuating the actuator assembly 224 (e.g., by activating the PDU 228 (FIG. 2) to swing the first flap 202 from the stowed position (FIG. 8A) to the deployed position (FIG. 8J) and/or any other position therebetween. The actuator assembly 224 may be actuated via the GRA 322, which rotates the actuating arm 314 (e.g., a crank or output arm of the GRA 322). The example sequence 8A-8J may be performed in reverse to move the first flap 202 from the deployed position (FIG. 8J) back to the stored position (FIG. 8A). In other words, the GRA 322 (FIG. 8A) may rotate the actuating arm 314 in the reverse direction (in the counter-clockwise of FIGS. 8A-8J), which pulls the first flap 202 back into the bottom of the first wing 104. Once moved back into the stowed position, the bottom panel 310 of the first flap 202 and the bottom wall 400 of the tilt arm 318 form a substantially smooth surface along the lower surface panel 302 of the first wing 104, as illustrated in FIG. 8A.

Figure 9:
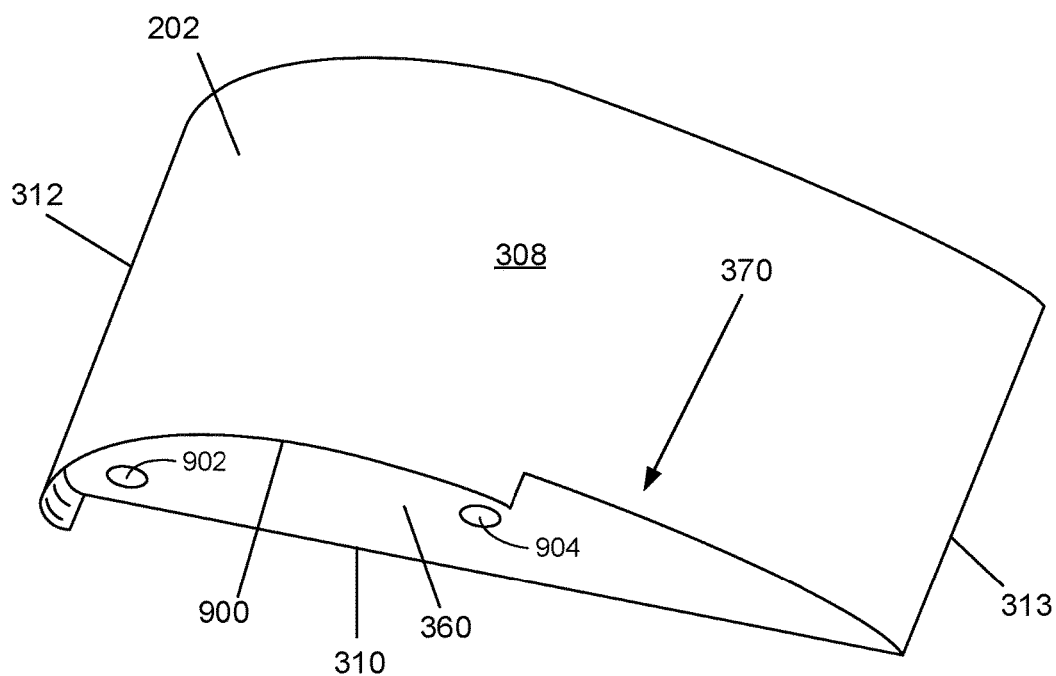
FIG. 9 is a perspective view of the first example flap of FIGS. 3A and 3B showing an example notch in a top panel of the first example flap.

As disclosed above, in the stowed position, at least a portion of the actuator assembly 224 extends through the first notch 370 in the top panel 308 of the first flap 202. FIG. 9 shows and perspective view of the example first flap 202. As shown in FIG. 9, the first notch 370 extends into a side 900 (e.g., an outboard side) of top panel 308 and extends back to the trailing edge 313. As a result, a portion of the top panel 308 near the leading edge 312 extends outward beyond the side wall 360 of the first flap 202. The bottom panel 310 of the first flap 202 is also recessed the same as the first notch 370 to allow the actuator assembly 224 (FIG. 3A) to move from the stowed position to the deployed position. In the illustrated example, the connection points 902, 904 (shown as circles) are illustrated on the side wall 360 where the fifth and seventh joints 358, 368, respectively, are formed.

Referring briefly back to FIG. 3A, the second flap 204 includes a similar notch, namely, the second notch 372, in the outboard side of the second top panel 374. The fore portions of the top panels 308, 374 near the leading edges are positioned next to each other and form a substantially continuous upper surface and the first and second notches 370, 372 form the slot 376 in the top panels 308, 374 to accommodate the actuator assembly 224. However, when the first and second flaps 202, 204 are in the deployed position, as illustrated in FIGS. 7A and 7B, the actuator assembly 224 extends outwardly from the bottom panels of the first and second flaps 202, 204. As a result, in the deployed position, the top panels 308, 374 of the first and second flaps 202, 204 including the first and second notches 370, 372 are exposed to the airflow. The first and second notches 370, 372 may negatively affect the airflow over the top panels 308, 374 of the first and second flaps 202, 204 and cause undesired aerodynamic effects. Therefore, in some examples, one or more example covers or seals may be used to cover the first and second notches 370, 372 in the first and/or second flaps 202, 204.

FIGS. 10-12 illustrate example seals that may be used to cover the first and second notches 370, 372 of the first and second flaps 202, 204. FIG. 10 is a top view of the first and second flaps 202, 204 in the deployed position (or a partially deployed position), FIG. 11 is a top view of the first and second flaps 202, 204 in the stowed position, and FIG. 12 is a cross-sectional view taken along line F-F in FIG. 11. In FIGS. 10 and 11, the top panels 308, 374 of the first and second flaps 202, 204 are transparent and shown in dashed lines to expose the seals and other structures therein. As illustrated in FIGS. 10 and 11, the first flap 202 includes a first seal 1000. The first seal 1000 has a body 1002 and an arm 1004. The body 1002 extends outward from the side wall 360 of the first flap 202 to cover or overlap the first notch 370 in the top panel 308 of the first flap 202, as illustrated in FIG. 10. As illustrated in FIGS. 10 and 11, the body 1002 has a rectangular shape viewed from the top and, as illustrated in FIG. 12, the body 1002 has a wedge shaped cross-section viewed from the side to match the curvature of the top panel 308 of the first flap 202. The first seal 1000 is movable between a closed position, as illustrated in FIG. 10, and an open position, as illustrated in FIG. 11. In the closed position the first seal 1000 substantially covers the first notch 370 and in the open position the first seal 1000 is moved out of the first notch 370. To enable the first seal 1000 to move, the arm 1004 is pivotably coupled to the first flap 202 at a first pivot point 1006 (FIGS. 10 and 11). In particular, as illustrated in FIG. 12, the arm 1004 of the first seal 1000 is pivotably coupled to a mount 1200 extending between the top panel 308 and the bottom panel 310 inside of the first flap 202. In the illustrated example of FIGS. 10-12, the first seal 1000 is biased to the closed position by a first spring 1008. The first spring 1008 is disposed in the first flap 202. As illustrated in FIGS. 10 and 11, one end of the first spring 1008 is disposed in a spring retainer 1010 in the first flap 202, and the other end of the first spring 1008 extends into a channel 1012 formed in the first seal 1000. As such, the first spring 1008 pushes the first seal 1000 toward the first notch 370. In some examples, one or more stops (e.g., a pin, a nub, etc.) may be provided to prevent the first seal 1000 from over extending (e.g., rotating) into the first notch 370. Similarly, as illustrated in FIGS. 10 and 11, the second flap 204 includes a second seal 1014 biased to the closed position via a second spring 1016. The second seal 1014 is substantially the same as the first seal 1000. To avoid redundancy, the structure and operation of the second seal 1014 not repeated herein. As illustrated in FIG. 10, the first and second seals 1000, 1014 substantially cover the slot 376 (formed by the first and second notches 370, 372) to form a substantially closed smooth surface along the top panels 308, 374 of the first and second flaps 202, 204. The first and second seals 1000, 1014 are movable toward each other to cover the slot 36 in the deployed position (FIG. 10) and away from each other to expose the slot 376 in the stowed position (FIG. 11).

For example, FIG. 11 shows the first and second seals 1000, 1014 in the open position after the first and second flaps 202, 204 have been moved to the stowed position (e.g., as shown in FIGS. 3A and 3B). When moving the first and second flaps 202, 204 from the deployed position to the stowed position, the actuating arm 314 and the tilt arm 318 move into the notches 370, 372 in the top panels 308, 374 of the first and second flaps 202, 204 and push the first and second seals 1000, 1014 outward, into the respective first and second flaps 202, 204. As illustrated in FIGS. 10 and 11, an edge 1018 (e.g., a leading edge) of the actuating arm 314 is tapered or angled, which creates less friction and enables easier entry as the actuating arm 314 spreads the first and second seals 1000, 1014 apart. In other words, the edge 1018 of the actuating arm 314 engages the first and second seals 1000, 1014 as the first and second flaps 202, 204 are moved from the deployed position to the stowed position. In the illustrated example, a first outer corner 1020 of the first seal 1000 is tapered, which further helps to enable the actuating arm 314 to slide into the first notch 370 and move the first seal 1000 outward. Similarly, the second seal 1014 includes a second outer corner 1022 that is tapered. In some examples, the angle of the first and second outer corners 1020, 1022 matches the angle of the leading edge 1018 of the actuating arm 314. In some examples, the leading edges of the side walls 600, 602 (FIG. 10) of the tilt arm 318 are also rounded or tapered, which further helps to reduce friction as the actuator assembly 224 enters the first and second notches 370, 372. When the first and second flaps 202, 204 are moved to the deployed position and the actuating arm 314 and the tilt arm 318 are moved out of the slot 376, the first and second seals 1000, 1014 move back together (e.g., via the first and second springs 1008, 1016) to substantially cover the slot 376.

Another example seal is illustrated in FIGS. 13-15. In particular, FIG. 13 is a top view of the first and second flaps 202, 204 in the deployed position (or a partially deployed position), FIG. 14 is a top view of the first and second flaps 202, 204 in the stowed position, and FIG. 15 is a cross-sectional taken along line F-F in FIG. 14. In FIGS. 13 and 14, the top panels 308, 374 of the first and second flaps 202, 204 are transparent and shown in dashed lines to expose the seals and other structures therein. As illustrated in FIGS. 13 and 14, the first flap 202 includes a first flexible seal 1300. The first flexible seal 1300 is disposed in a recess 1302 formed in the side wall 360 of the first flap 202 and extends outward into the first notch 370. The first flexible seal 1300 is constructed of an elastomeric material (e.g., rubber, silicone, fiber-glass reinforced silicone, etc.) that is deformable (e.g., compressible) or displaceable and that returns to substantially the same shape after being deformed or displaced. In particular, the first flexible seal 1300 is deformable from a first shape (e.g., a non-deformed state) substantially covering the first notch 370, as illustrated in FIG. 13, to a second shape (e.g., a deformed state) providing space in the first notch 370, as illustrated in FIG. 14. Similarly, as illustrated in FIGS. 13 and 14, the second flap 204 includes a second flexible seal 1304 constructed of an elastomeric material. The second flexible seal 1304 is substantially the same as the first flexible seal 1300. To avoid redundancy, a description of the structure and operation of the second flexible seal 1304 is not repeated herein. As illustrated in FIG. 13, the first and second flexible seals 1300, 1304 substantially cover the slot 376 to form a substantially closed smooth surface along the top panels 308, 374 of the first and second flaps 202, 204.

FIG. 14 shows the first and second flexible seals 1300, 1304 in the deformed state after the first and second flaps 202, 204 have been moved to the stowed position (e.g., as shown in FIGS. 3A and 3B). For example, when moving the first and second flaps 202, 204 from the deployed position to the stowed position, the actuating arm 314 and the tilt arm 318 move into the slot 376 (formed by the first and second notches 370, 372) and displace or deform the first and second flexible seals 1300, 1304. As disclosed in connection with FIGS. 10 and 11, the edge 1018 of the actuating arm 314 may be tapered or angled to reduce friction as the actuating arm 314 and the tilt arm 318 spread the first and second flexible seals 1300, 1304 apart. In some examples, the first and/or second flexible seals 1300, 1304 may include a spring member to help return the respective first and second flexible seals 1300, 1304 back to the first (undeformed) shape (FIG. 13) after being deformed. For example, as illustrated in FIGS. 13 and 14, a first spring member 1306 is coupled to the first flexible seal 1300. The first spring member 1306 helps bias the first flexible seal 1300 back to its original shape once the actuating arm 314 and tilt arm 318 are moved out of the first notch 370. In the illustrated example, a first portion 1308 of the first spring member 1306 is coupled to the side wall 360 and a second portion 1310 of the first spring member 1306 extends through the first flexible seal 1300. In the illustrated example, the first spring member 1306 is molded into the elastomeric material of the first flexible seal 1300. In other examples, the first spring member 1306 may be coupled to the first flexible seal 1300 using other chemical and/or mechanical fastening techniques. The first flexible seal 1300 and the first spring member 1306 are also shown in FIG. 15. As illustrated in FIGS. 13 and 14, an end 1312 of the first spring member 1306 is angled or tapered outward to receive the leading edge 1018 of the actuating arm 314. In some examples, the end 1312 of the first spring member 1306 is angled at the same angle as the leading edge 1018 of the actuating arm 314. Similarly, in the illustrated example of FIGS. 13 and 14, the second flexible seal 1304 includes a second spring member 1314 that operates in substantially the same manner.

While in the example of FIGS. 10-12 and the example of FIGS. 13-15 the seals in the notches 370, 372 are the same type of seal, in other examples, the first and second flaps 202, 204 may utilize different types of seals than each other. For example, the first flap 202 may utilize the first seal 1000 from FIGS. 10-12 and the second flap 204 may utilize the second flexible seal 1304 from FIGS. 13-15. Further, in other examples, the first and/or second flaps 202, 204 may employ other types of seals or structures to cover the respective notches when the first and second flaps 202, 204 are in the deployed position. Additionally or alternatively, in other example, other types of actuating mechanisms may be utilized to move a seal between an open position and a closed position. For example, a solenoid switch may be used to move a seal between the open position and the closed position. In still other examples, no seal(s) may be used.

Figure 16:
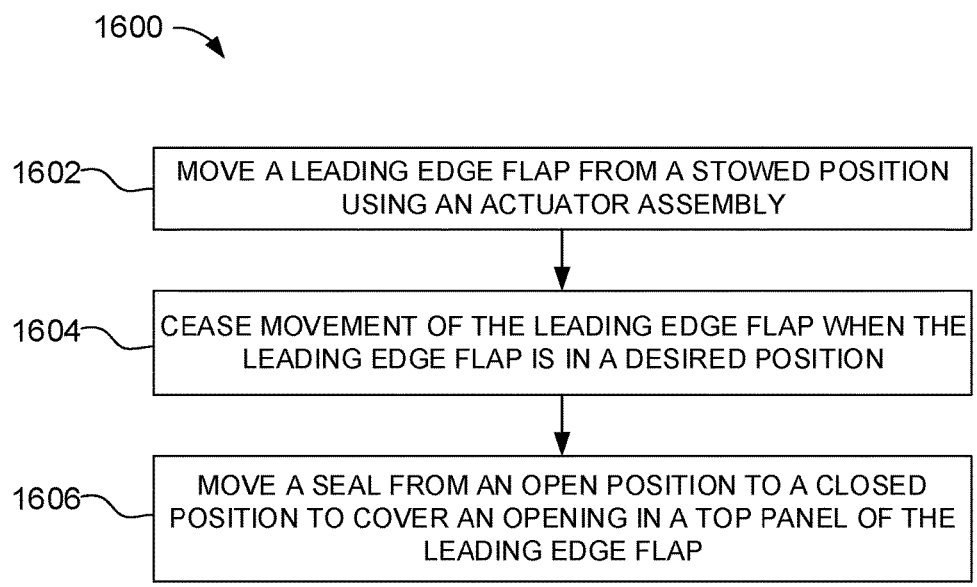
FIG. 16 is a flowchart representative of an example method of deploying a flap using the example actuator assembly of FIGS. 3A and 3B.

FIG. 16 illustrates an example method 1600 that may be performed using the example actuator assembly 224 of FIGS. 3A and 3B to deploy a leading edge flap to enable laminar flow over a wing. The example method 1600 is described in connection with the first flap 202 and the first wing 104. However, the example method 1600 may be similarly performed by other ones of the actuator assemblies 224 with the other flaps 204-220. Further, two or more of the example actuator assemblies 224 may be configured to perform the example method 1600 simultaneously to deploy one of the flaps (e.g., where one actuator assembly is coupled to an inboard side of a flap and another actuator assembly is coupled to an outboard side of the flap).

At block 1602, the example method 1600 includes moving the flap 202 from the stowed position using the actuator assembly 224. In the stowed position, as illustrated in FIG. 3B, the first flap 202 is disposed in the cavity 304 of the first wing 104 and the bottom panel 310 of the first flap 202 forms part of a bottom of the first wing 104. The actuator assembly 224 may move the first flap 202 by activating the GRA 322. The GRA 322 may be activated via one or more of the torque tubes 226, which are driven by the PDU 228. When activated, the GRA 322 rotates the actuating arm 314 downward, which swings the first flap 202 outward and forward from the lower surface panel 302 of the first wing 104. As illustrated in the example sequence of FIGS. 8A-8J, the first flap 202 is moved along an arc-shaped path outward from the lower surface panel 302 of the first wing 104.

At block 1604, the example method 1600 includes ceasing movement of the first flap 202 when the first flap 202 is in a desired position. The actuator assembly 224 may stop the movement by deactivating the GRA 322 (e.g., by ceasing power from the PDU 228). The desired position may be a fully deployed position, such as in FIGS. 7B and 8J. In some examples, in the desired position (e.g., the fully deployed position), the trailing edge 313 of the first flap 202 is spaced forward from the leading edge 201 of the first wing 104. The first flap 202 enhances laminar airflow over the upper surface panel 300 of the first wing 104. The first flap 202 may be deployed during takeoff and landing, for example, to generate higher lift with the first wing 104. In other examples, the desired position may be any position between the stowed position (e.g., FIGS. 3B and 8A) and a fully deployed position (e.g., FIGS. 7B and 8J). The first flap 202 may be stopped at various positions to affect the airflow over the first wing 104.

In some examples, the first flap 202 may include a seal, such as the first seal 1000 (FIG. 10), that moves from the open position (FIG. 10) to the closed position (FIG. 11) to cover the first notch 270 in the top panel 308 of the first flap 202. In such an example, the example method 1600, at block 1606, includes moving the first seal 1000 from the open position to the closed position to cover an opening (e.g., the notch 370) in the top panel 308 of the first flap 202. In some examples, the first seal 1000 is moved via the first spring 1008. In other examples, such as with the first flexible seal 1300 of FIG. 13, the first flexible seal 1300 may return (e.g., after being compressed) to a non-deformed state that covers the first notch 370.

To move the first flap 202 back to the stowed position, the GRA 322 may be activated to rotate the actuating arm 314 in the reverse direction, which swings the first flap 202 back through the opening 306 into the cavity 304 in the first wing 104. Once in the stowed position, the actuator assembly 224 ceases movement of the first flap 202.

From the foregoing, it will be appreciated that example methods, apparatus, systems, and articles of manufacture are disclosed herein for moving a leading edge flap between a stowed position and a deployed position. Examples disclosed herein move a flap along a path that enables a top panel of the flap to be facing upward in the stowed position in the wing, thereby allowing the top panel to be designed without limitation as compared to known systems where the flap is stowed upside down. Example actuator assemblies disclosed herein utilize a 6-bar linkage having fewer components than known actuator assemblies. As such, example actuator assemblies disclosed herein are lighter in weight and cost substantially less than known actuator assemblies. Further, example actuator assemblies disclosed herein are more compact and can be more easily stowed in the wing. The example actuator assemblies also avoid moving the flap in a direction that is perpendicular (e.g., the "barn door" condition) to the airflow, thus the aerodynamic loads on the flaps are lower and a lighter, smaller actuator can be used. While the example actuator assemblies disclosed here are described in connection with leading edge flap(s), the example actuator assemblies can similarly be used for other types of high lift devices, such as trailing edge flaps. Also disclosed herein are example seals that advantageously cover the notches in the top panels of the flaps to create a smoother top surface that is more aerodynamic.

Although certain example methods, apparatus, systems and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An apparatus comprising:
   an aircraft flap movable between a stowed position and a deployed position, the flap including a top panel, a notch formed in the top panel, the notch extending into a side of the top panel and extending back to a trailing edge of the flap;
   a seal coupled to the flap, the seal movable to cover the notch when the flap is in the deployed position; and
   an actuator assembly to move the flap between the stowed position and the deployed position, wherein the actuator assembly is to move the seal out of the notch when moving the flap from the deployed position to the stowed position, and the actuator assembly is to enable the seal to cover the notch when the flap is in the deployed position.

2. The apparatus of claim 1, wherein, when the flap is in the stowed position, the actuator assembly extends through the notch in the top panel, and, when the flap is in the deployed position, the actuator assembly extends outwardly from a bottom panel of the flap.

3. The apparatus of claim 2, wherein an arm of the actuator assembly has an edge that is tapered or angled, the edge of the arm to engage the seal as the flap is moved from the deployed position to the stowed position.

4. The apparatus of claim 1, wherein the seal is pivotably coupled to a mount inside the flap, and wherein the seal is pivotable between a closed position where the seal substantially covers the notch and an open position where the seal is moved out of the notch.

5. The apparatus of claim 4, further including a spring to bias the seal to the closed position.

6. The apparatus of claim 4, wherein an outer corner of the seal is tapered.

7. The apparatus of claim 1, wherein the seal is constructed of an elastomeric material, and wherein the seal is deformable from a first shape substantially covering the notch to a second shape providing space in the notch.

8. The apparatus of claim 7, further including a spring member coupled to the seal to expand the seal back to the first shape after being deformed.

9. The apparatus of claim 8, wherein the spring member is molded into the elastomeric material of the seal.

\* \* \* \* \*